United States Patent Office 2,780,614
Patented Feb. 5, 1957

2,780,614

MIXTURES OF A DIENE RUBBER AND A PARTIALLY HYDROGENATED FURFURYL-KETONE PRODUCT

Mortimer T. Harvey, South Orange, N. J., assignor to Harvel Research Corporation, a corporation of New Jersey No Drawing. Application May 1, 1952,
Serial No. 285,539

9 Claims. (Cl. 260—45.5)

This invention relates to novel compositions of matter and to methods for preparing them. In one of its more specific aspects, the invention is directed to combining (I) a rubbery material selected from the group consisting of natural rubber, rubbery polymers of chloroprene, rubbery polymers of butadiene, rubbery copolymers of butadiene and styrene, and rubbery copolymers of butadiene and acrylonitrile as well as mixtures of two or more of them with (II) a partially hydrogenated organic reaction product normally liquid at 100° C., that is, exhibiting cold flow at 100° C. and selected from the group consisting of (a) partially hydrogenated monofurfuryl-ketone, (b) partially hydrogenated difurfuryl-ketone, (c) partially hydrogenated organic reaction masses, said organic reaction masses before hydrogenation having a viscosity of at least 50 cp. at 25° C. and produced by reacting under alkaline conditions furfuraldehyde and a ketone having at least two hydrogen atoms on an alpha carbon, (d) partially hydrogenated residual fractions of said reaction masses, said fractions before hydrogenation obtained by heat distillation of said reaction masses and measuring by weight at least 60% of said reaction masses, (e) residual fractions obtained by heat distillation of (c) and measuring at least 60% by weight of (c), (f) polymerized products produced by polymerizing (a)–(e) under acidic conditions, said (a)–(d) produced by hydrogenating monofurfuryl-ketone, difurfuryl-ketone, said organic reaction masses and residual fractions thereof before hydrogenating to an extent at least approximately 15% and no more than approximately 65% of that necessary to completely saturate the carbon to carbon double bonds thereof. The ratio by weight of (I) to (II) may vary over wide limits and may be in the ratio range of 100 parts of (I) to 5–100 parts of (II). Such combinations when cured have improved ozone resistance when compared with the rubbery materials when cured but without product (II).

Prior to this invention, I produced novel products by partially hydrogenating furfuraldehyde-ketone organic reaction products and also other novel products by thickening or polymerizing said partially hydrogenated furfuraldehyde-ketone organic reaction products under acidic conditions. The methods for producing them are disclosed in my copending applications 144,594, filed February 16, 1950, and 274,080, filed February 29, 1952, which respectively issued on June 17, 1952, as U. S. Patents 2,600,403 and 2,600,764 and are made part hereof. They disclose partially hydrogenated products in both the thickened and unthickened states and methods for preparing them.

The furfuraldehyde-ketone reaction products may be prepared by employing any of the methods known to the art. One method which may be employed in the preparation of the starting materials is to first produce the unhydrogenated reaction products. For this purpose, the furfuraldehyde and ketone are mixed with each other and then thereto is added a quantity of an alkaline material such as an aqueous solution of sodium hydroxide, potassium hydroxide, lime or the like. These three components are mixed with each other in an autoclave or closed unit and shortly after the mixture takes place an exothermic reaction occurs and the pressure within the autoclave will rise. This vigorous reaction is not easily controlled by ordinary methods, such as by using reacting units which have air vents through the top, because under such conditions many times there may be losses of some of the reaction products escaping through the air vents. For this reason, an autoclave is recommended as the reacting unit. After the exothermic reaction has subsided, the reaction is practically complete. In order to assure complete reaction and high yields, the mass in the autoclave is externally heated to maintain it in the state of boiling for a period of time depending upon the viscosity desired of the resultant reaction mass, which may vary from a thin liquid to a solid at room temperature. Generally, I prefer that the time of boiling is such that the viscosity of the reaction mass employed as a starting material when dehydrated is a liquid, that is, it is pourable at 25° C. and for some purposes at the present time no greater than approximately 20,000 cp. at 25° C., and in all cases no lower than 50 cp. at 25° C. This reaction provides compounds which are mono and di-furfuryl ketones, having the following formulae:

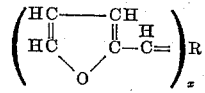

in which $x$ is a whole number selected from the group of 1 and 2, and R is a ketone lacking two of the hydrogen atoms normally on either one or both of its alpha carbons. These compounds are produced as a result of reaction between the furfuraldehyde and ketone wherein two hydorgen atoms on the alpha carbons unite with the oxygen of the furfuraldehyde to split off water. This reaction also provides an amorphous or resinous material. The quantity of said resinous material present in the reaction mass varies and is dependent upon the time magnitude of boiling of the reaction mass and is approximately 5% or more of the reaction mass by weight and in general measures about 5%–60% by weight of the reaction mass.

Reference is hereby made to the United States Patent 2,363,828 which issued to me and S. Caplan on November 28, 1944, and particularly to those examples therein disclosing organic reaction products produced by reacting under alkaline conditions furfuraldehyde and a ketone having two hydrogen atoms on an alpha carbon, and all of those compositions as well as fractions thereof may be employed as the unhydrogenated reaction products herein. The resultant reaction mass or any desired fraction thereof, some of which are particular compounds and others of which may be the residues or mixtures of two or more of them, may be employed as the unhydrogenated materials. The unhydrogenated reaction products thus include the organic reaction masses, the distillates as well as the residual fractions which may be obtained by the heat distillation of the masses, and I prefer that the heat distillation of the masses be carried out so that the weight of the residual fraction is at least 60% and preferably 60–95% by weight of the organic reaction mass. All of said unhydrogenated reaction products may be hydrogenated in order that at least approximately 15% and no more than 65% of the carbon to carbon double bonds thereof have been saturated with hydrogen.

In the following general example, the resultant reaction products produced by the general method heretofore described will be treated merely to disclose a general method for hydrogenation, it being understood that any of the other aforesaid compositions may be used in place thereof.

GENERAL EXAMPLE

Said resultant reaction mass may then be rendered substantially neutral in any convenient manner. This may be easily accomplished by adding thereto the requisite amount of an aqueous solution of an acidic agent, such as hydrochloric acid, sulphuric acid, lactic acid or the like. Generally it is preferable that the amount of acidic agent be such as to lower the pH of the mass to a value in the range of 3–7.4 and generally in the range of 3–6.

Following this step, the mass is substantially completely dehydrated. One method for doing this is to heat, preferably under a high vacuum, until all of the water and any unreacted components have been substantially completely distilled off.

This completely dehydrated reaction product may then be hydrogenated only partially by employing a nickel catalyst, maintaining the temperature thereof at a value of at least 120° C. and preferably in the range of 120–250° C. and the pressure thereof at a value of at least 25 lbs. per square inch and between 25–250 lbs. per square inch. The nickel employed may be in a finely divided state and may be coupled with any suitable carrier such as a hydrogenated vegetable oil, hydrogenated cardanol, etc.

Briefly, the hydrogenation may be accomplished by adding the requisite amount of nickel catalyst in the carrier to said dehydrated approximately neutral reaction product and the mixture is heated while vacuum is applied and agitated until a uniform mixture has been obtained. When the temperature of the mix reaches 120° C. the external source of heat is removed, hydrogen gas is admitted thereto to provide a pressure of 25–250 lbs. per square inch whereupon hydrogenation takes place and is an exothermic reaction. The addition of the hydrogen is continued whereupon the temperature of the mass rises and is maintained at a level no greater than 250° C. and the pressure is maintained at a value no greater than 250 lbs. per square inch and generally between 30–75 lbs. per square inch. The hydrogen is continuously added under the aforesaid conditions until the amount of added hydrogen is approximately 70–340 cubic feet measured at 20° C. and 760 mm. pressure. The hydrogen added and combined is approximately 15–65% of the quantity of hydrogen necessary for complete saturation of all the carbon to carbon double bonds thereof. The hydrogenation is discontinued after the desired degree of hydrogenation has been attained. Then the hydrogenated mass is allowed to cool to room temperature. By this procedure the reaction mass after hydrogenation is still unsaturated. The carbon to carbon double bonds of the compounds in said mass and outside of the furane ring have been at least 50% saturated with hydrogen, and may be 50–100% saturated with hydrogen with 0–50% saturation with hydrogen of the carbon to carbon double bonds in the furane ring.

When the mass to be hydrogenated is of a very high viscosity, for example, over 20,000 cp. at 25° C., I first dissolved the mass in a solvent, such as a high molecular weight ketone and then hydrogenated under the aforesaid conditions.

The partially hydrogenated reaction mass may be polymerized or thickened under acidic conditions to provide polymerized products of any desired viscosity. In this manner, slightly to highly polymerized products having unusual stability characteristics may be obtained. These polymerized or thickened products are characterized by when maintained at 300° F. for 24 hours they are in the substantially infusible state at the end of that period. In general, these polymers, either of low or high molecular weight, may be produced by adding to the hydrogenated mass or any fraction thereof an acidic catalyst such as sulphuric acid, phosphoric acid, hydrochloric acid, diethyl sulphate, zinc chloride, boron trifluoride, or the like to provide an acidic condition such that the pH of the mass is in the range of approximately 2–3.5. In factory practice the pH of the mass is approximately 3 or slightly below. Such acidified mass is heated to a temperature of 180° F. or above, and generally around 220–350° F. until the polymerization or thickening has reached the desired degree as evidenced by increasing viscosity which in all cases is at least 100% greater than the viscosity of the hydrogenated mass at 25° C. before said polymerization or thickening. In all cases, I prefer that the polymerization be discontinued before the mass, when at 100° C. is in the solid state, and in all cases in the practice of this invention, the polymerized or thickened hydrogenated products as well as the unpolymerized or unthickened hydrogenated products are in the liquid condition at 100° C., that is, they will exhibit flow at 100° C.

The following Examples 1–7 are given merely to further illustrate the methods for providing some of the starting materials and are not to be construed in a limiting sense, all parts being given by weight unless otherwise specified.

*Example 1*

Into a one-gallon pail is placed a quantity of sodium hydroxide weighing 2 lbs. 6 oz. Then there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 24 lbs. of acetone. This autoclave is preferably provided with a mechanical mixer or agitator which may be in the nature of a paddle mixer. This mixture is agitated and while in the state of agitation there is added thereto about ⅙ of the volume of said heretofore prepared aqueous solution of sodium hydroxide. With all the valves of the autoclave closed it will be noted that an exothermic reaction takes place in a very few minutes after the addition of the sodium hydroxide solution and the temperature of the mass continuously agitated by the stirrer will rise to approximately 150° F. in about three or four minutes. After about 10 minutes there is added to the mass in said autoclave another charge consisting of 40 lbs. of furfuraldehyde and 24 lbs. of acetone. Then to the mass in the autoclave there is added a second increment of said sodium hydroxide solution equal in volume to the first addition. After a few minutes the temperature of the mass will, due to the exothermic reaction, rise to approximately 165–170° F. The foregoing steps are repeated four more times so that the amount of furfuraldehyde and acetone added to the autoclave are equal to 240 lbs. and 144 lbs. respectively, and all of the initially prepared aqueous solution of sodium hydroxide has been added. After the last addition of sodium hydroxide the temperature of the mass within the autoclave will have stabilized to about 180–195° F. Then the mass within the autoclave may be heated by means of a steam coil located therein and through a jacket carried thereby to maintain the temperature of the mass between approximately 185–190° F. for about 30 minutes in order to complete the reaction and to obtain high yields. The steam is cut off from the coil and jacket and then there is added thereto an aqueous solution of sulphuric acid in quantities sufficient to render the mass practically neutral. In this instance, there may be added an aqueous solution of sulphuric acid consisting of 3 lbs. 3 oz. of concentrated sulphuric acid diluted in 6 lbs. 6 oz. of water. Then this mass may be heated for about 5 minutes at a temperature between 175–200° F. to substantially completely neutralize the mass. The substantially neutral mass may then be substantially completely dehydrated by heating the same to a temperature of 220° F. with or without vacuum, yielding approximately 300 lbs. of dehydrated substantially neutral material known as product A, whose viscosity is 92 cp. at 25° C., and having a specific gravity at 25° C. of 1.150. When this material, product A, is distilled at a pressure of approximately .1 mm. of mercury pressure a fraction (37%) weighing approximately 110 lbs. comes off at temperatures in the range of 70–85° C. and is hereinafter known as fraction I, apparently essentially monofurfuryl-acetone leaving behind a residual fraction known as product RFA, and a fraction (47%) measuring approximately 140 lbs. comes off in the temperature range of 150–165° C. and hereinafter is known as fraction II. The residue measuring approximately 50 lbs. is a brittle solid on cooling. Analysis of fraction I established a carbon content of 70.30% and hydrogen of 5.48% which corresponds to the carbon and hydrogen values of furfural acetone having the following formula:

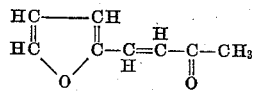

Analysis of fraction II established a carbon content of 73.07% and a hydrogen content of 4.58% corresponding to the carbon and hydrogen values of difurfural acetone having the following formula:

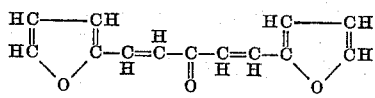

Example 1A 40 lbs. of product A is placed in a 10-gallon closed unit equipped with a high speed propeller. Then one lb. of a catalyst and carrier combination containing 25% of catalytic nickel dispersed in a hydrogenated vegetable oil is added thereto and the mixture is continuously stirred in order to maintain a uniform distribution of the components. While in this state of agitation, the mass is externally heated to a temperature of 120° C. after substantially all the air in the container has been evacuated therefrom. Then hydrogen is admitted to provide a pressure of 40 lbs. per square inch. Hydrogen is continuously admitted to the mass and hydrogenation takes place exothermically and now the external source of heat is removed therefrom. By controlling the speed of addition of the hydrogen to the mass, the temperature is maintained at approximately 200° C. and the pressure of approximately 50 lbs. per square inch. The temperature during hydrogenation may also be controlled by external cooling. The hydrogen addition is terminated when no more hydrogen is taken up under these conditions with a period of about 30 minutes. The quantity of hydrogen taken up in this particular hydrogenation step apparently due to early poisoning of the catalyst amounted to approximately 145 cubic feet which corresponds roughly to the quantity of hydrogen required to saturate only the unsaturated carbon to carbon atoms outside of the furane ring.

This hydrogenated product A, hereinafter known as HA is still a thin liquid and may be distilled if desired to provide separate various fractions thereof. By distilling this hydrogenated product A at 0.3 mm. of mercury pressure a fraction distilled off up to 100° C. and was collected and amounted to 32%; a second fraction amounting to 41% distilled off and was collected at 120–170° C. That fraction which distilled off up to 100° C. is hereinafter known as product HA-1 and consisted essentially of a compound having the following formula:

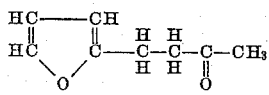

The second fraction which distilled off at 120–170° C. is hereinafter known as product HA-2 and consisted essentially of a compound having the following formula:

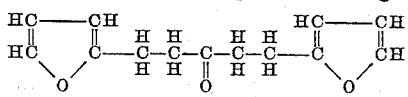

The residue known as HA-3 upon cooling was a brittle black solid.

Example 2

By using the same procedure as that set forth in Example 1, and substituting 180 lbs. of methyl ethyl ketone for the 144 lbs. of acetone, and terminating hydrogen addition when approximately 150 cu. ft. of hydrogen have been taken up, there may be produced a novel hydrogenated product. This hydrogenated product known as product HB may be distilled to provide fractions HB-1 and HB-2 respectively, chiefly consisting of the following compounds:

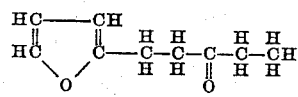

and

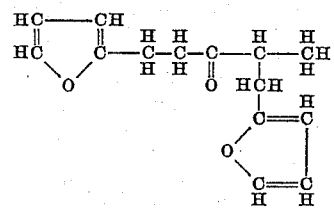

and a resinous residue HB-3 of more than 5% of the hydrogenated mass.

Example 3

By using the same procedure as that set forth in Example 2, and substituting 240 lbs. of diacetone alcohol for 180 lbs. methyl ethyl ketone, there may be produced a novel hydrogenated product known as HC. This hydrogenated product HC may be distilled to provide fractions HC-1 and HC-2 respectively, consisting chiefly of the following compounds:

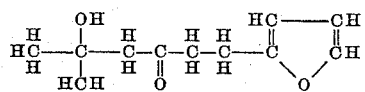

and

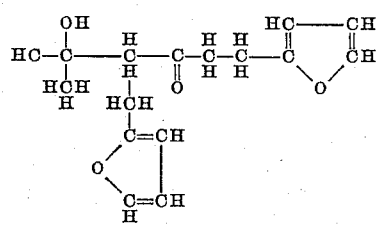

and a resinous residue HC-3 of more than 5% of the hydrogenated mass.

Example 4

Following the same procedure as that set forth in Example 1A and using fresh catalyst and terminating the hydrogenation after approximately 70, 100, 150, 175, 210 and 235 cu. ft. of hydrogen were taken up in six different 40 lb. batches of product A, I obtained products HD, HE, HF, HG, HH and HI, differing from each other in the degree of hydrogen saturation.

Example 5

Following the same procedure as that set forth in Example 1A and employing fresh catalyst, 235 cu. ft. of hydrogen were taken up in a 40 lb. batch of product A. Then the same amount of fresh catalyst, .25 lb. powdered nickel, was added thereto and hydrogenation continued until a total of 340 cu. ft. of hydrogen was taken up. This product is known as product HJ.

Example 6

Following the same procedure as that of Example 1A and employing fraction I of Example 1 in place of product A, and terminating the hydrogenation after 1.3 and 1.8 moles proportionately of hydrogen were taken up by 1 mole proportion of said fraction, approximately 95 and 130 cu. ft. of hydrogen per 40 lbs. of fraction I. The hydrogenation above the 1.3 mole proportion proceeded with difficulty. These two hydrogenated products are HK and HL and were respectively about 43% and 60% hydrogenated at the carbon to carbon double bonds.

*Example 7*

Following the same procedure as that of Example 1A and employing fraction II of Example 1 in place of product A, and 1 to 4 moles of hydrogen were taken up. Above 2 moles of hydrogen addition, additional increments of nickel catalyst were used. Various samples of 1, 2, 3 and 4 moles of hydrogen addition products are known as HM, HN, HO and HP respectively, and respectively were approximately 15, 30, 50 and 65% hydrogen saturated at the carbon to carbon double bonds.

All of these various partially hydrogenated products, examples of which have been hereinbefore set forth, may be polymerized or thickened in the manner heretofore generally described to provide polymers thereof and having a viscosity at 25° C. at least 100% greater than the partially hydrogenated products before said polymerization under acidic conditions.

The method which I have employed for ascertaining the pH of the various materials herein is that commonly used in the art for materials that are substantially free of water and substantially insoluble in water, and is as follows: About a 10–20 cc. sample of the material, and in this case the partially hydrogenated product together with the acidic agent, whose pH is to be ascertained is placed in a test tube containing about an equal volume of distilled water. The mixture is heated to about boiling while being shaken and then allowed to stand and come to room temperature. Then this aqueous mass is tested with a pH test paper commonly employed in the art.

According to this invention, said partially hydrogenated furfuraldehyde-ketone reaction products, illustrative examples of which are products HA, HA–1, HA–2, HB, HB–1, HB–2, HC, HC–1, HC–2, and HD–HP, as well as any of them polymerized or thickened under acidic conditions, may be combined with any one or a combination of two or more of said rubbery materials in the proportions heretofore set forth.

Employing the milling procedures well known to the art, 100 parts by weight of any one or a combination of two or more of said rubbery materials is milled on a rubber mill. After the rubbery material has been sufficiently broken down by the milling action, there is added thereto 5–100 parts by weight of any one or a combination of two or more of said products (II). However, I prefer that when product II is of low viscosity that the ratio by weight of the rubbery material to product II be 100 parts of the former to 5–50 parts of the latter, because of the strength of the combined materials on the mill; but when product II is of high viscosity then the ratio by weight of the rubbery material to product II may be 100 of the former to 5–100 of the latter. Instead of employing a rubber mill to effect the combination, the combination may be produced by employing any one of a variety of mixers such as dough mixers, Banbury mixers, etc., and in such cases the quantity of fillers and other components may be so adjusted that 5–100 parts of product II may be intimately combined with 100 parts of the rubbery material whatever the viscosity of product II. By whatever method and apparatus employed, said rubbery material and product II may also be combined with suitable fillers, vulcanizers, etc., to provide a homogeneous mass. The sequence of blending the fillers, vulcanizers, and product II may vary. After the blended mass has been produced, it may be extruded, molded or otherwise formed and cured according to the end product desired. For example, the composition may be extruded directly on to a cable or other conductor and such covering thereon may be subsequently cured to provide insulation of high dielectric strength and ozone resistance.

The following examples are given merely to illustrate only some of the novel compositions of this invention and are not to be construed in a limiting sense, all parts being given by weight unless otherwise indicated.

EXAMPLE A 100 parts of "neoprene-GN" (polychloroprene) is placed on a rubber mill and there were successively blended therewith the following components: 0.5 part of stearic acid, 50 parts "SRF Black" (carbon black), 2 parts of phenyl beta naphthylamine (antioxidant), 5–30 parts of product HA, 5 parts of zinc oxide and 4 parts of magnesium oxide. At the end of the last blending operation, the mass is substantially homogeneous and is now stripped from the mill. This resultant mass may be extruded, molded or in another manner formed and subsequently cured at 275–325° C. for a period of 60–5 minutes.

EXAMPLE B 100 parts of "Hycar-OR-25" (copolymer of butadiene and acrylonitrile) was broken down on the mill and there was successively blended therewith the following components: 1 part of stearic acid, 60 parts of "SRF Black" (carbon black), 5–100 parts of product HA, 2 parts of sulphur, and 1.5 parts of benzothiazyl disulphide. At the end of this blending operation, the same subsequent procedure is followed as in Example A to provide a wide variety of novel products.

EXAMPLE C 100 parts of "GRS–SP 65" (copolymer of butadiene and styrene) is placed on a rubbery mill and there was successively blended therewith the following components: 1 part of stearic acid, 50 parts of "SRF Black," 5–30 parts of product HA, 1 part of phenyl beta naphthylamine, 2 parts of sulphur, 1.5 parts of mercapto benzo thiazole and 0.15 part of zinc dimethyl dithio carbamate. At the end of this blending operation, the same subsequent procedure is followed as in Example A to provide a wide variety of novel products.

EXAMPLE D 100 parts of natural rubber (smoked sheet) is placed on a rubber mill, broken down and there is blended therewith the following components: 1 part of stearic acid, 0.5 part of phenyl beta naphthylamine, 4 parts zinc oxide, 75 parts Dixie clay, 5–50 parts product HA, 20 parts litharge, 3 parts sulphur, and 1.5 parts benzothiazole disulphide. At the end of this blending operation, the same subsequent procedure is followed as in Example A to provide a wide variety of novel products.

EXAMPLE E

Employing the same procedure and materials as set forth in Examples A–D, but for HA substituting the products HA–1, HA–2, HB, HB–1, HB–2, HC, HC–1, HC–2, or HD–HP, or any one of them or HA polymerized under acidic conditions and at 100° C. having a viscosity at least twice that of the product before said acid polymerization and all being the liquid state at that temperature, a number of highly useful products are obtained.

Examples of other ketones which may be employed to produce the starting materials employed herein are methyl isobutyl ketone, isophorone, cyclohexanone, mesityl oxide, methyl n-amyl ketone, acetonylacetone, diethyl ketone, di-isobutyl ketone, etc.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

This application is a continuation in part of my copending applications Serial No. 732,124 of March 3, 1947; Serial No. 740,742 of April 9, 1947; subsequently abandoned and Serial No. 144,594 of February 9, 1950, and Serial No. 274,080 of February 29, 1952, respectively issued as U. S. Patents 2,600,403 and 2,600,764 on June 17, 1952.

I claim:

1. A composition of matter comprising (I) a material selected from the group consisting of natural rubber, rubbery polymers of chloroprene, rubbery homopolymers of butadiene, rubbery copolymers of butadiene and styrene, rubbery copolymers of butadiene and acrylonitrile intimately combined with (II) a partially hydrogenated organic reaction product normally liquid at 100° C. and selected from the group consisting of (a) partially hydrogenated monofurfuryl-ketone, (b) partially hydrogenated difurfuryl-ketone, (c) partially hydrogenated organic reaction masses, said (c) being (x) organic reaction masses having a viscosity of at least 50 centipoises at 25° C. and produced by reacting under alkaline conditions furfural and a ketone having at least 2 hydrogen atoms on an alpha carbon and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof the ratio by weight of (II) to (I) being no greater than 100 to 100.

2. A composition of matter comprising (I) a rubbery material selected from the group consisting of natural rubber, rubbery polymers of butadiene, rubbery homopolymers of chloroprene, rubbery copolymers of butadiene and styrene, and rubbery copolymers of butadiene and acrylonitrile intimately combined with (II) a partially hydrogenated organic reaction mass normally liquid at 100° C. said (II) being (x) an organic reaction mass having a viscosity of at least 50 centipoises at 25° C. and produced by reacting under alkaline conditions furfural and a ketone having at least 2 hydrogen atoms on an alpha carbon and then hydrogenating (x) by combining hydrogen therewith to an extent at least approximately 15% and no more than approximately 65% of that necessary to completely saturate with hydrogen the carbon to carbon double bonds thereof the ratio by weight of (II) to (I) being no greater than 100 to 100.

3. A composition of matter comprising (I) a rubbery material selected from the group consisting of natural rubber, rubbery polymers of chloroprene, rubbery homopolymers of butadiene, rubbery copolymers of butadiene and styrene, and rubbery copolymers of butadiene and acrylonitrile with (II) a partially hydrogenated organic reaction mass (c) which was thickened under acidic conditions and is normally liquid at 100° C., said (c) being (x) an organic reaction mass having a viscosity of at least 50 centipoises at 25° C. and produced by reacting under alkaline conditions furfural and a ketone having at least 2 hydrogen atoms on an alpha carbon and then hydrogenating (x) by combining hydrogen therewith to an extent at least approximately 15% and no more than approximately 65% of that necessary to completely saturate with hydrogen the carbon to carbon double bonds thereof the ratio by weight of (II) to (I) being no greater than 100 to 100.

4. A composition of matter comprising (I) a rubbery material selected from the group consisting of natural rubber, rubbery polymers of chloroprene, rubbery homopolymers of butadiene, rubbery copolymers of butadiene and styrene, and rubbery copolymers of butadiene and acrylonitrile intimately combined with (II) a partially hydrogenated difurfuryl-ketone being difurfuryl-ketone hydrogenated to an extent at least approximately 15% and no more than approximately 65% of that necessary to completely saturate with hydrogen the carbon to carbon double bonds thereof the ratio by weight of (II) to (I) being no greater than 100 to 100.

5. A composition of matter comprising (I) a rubbery material selected from the group consisting of natural rubber, rubbery polymers of chloroprene, rubbery homopolymers of butadiene, rubbery copolymers of butadiene and styrene, and rubbery copolymers of butadiene and acrylonitrile intimately combined with (II) partially hydrogenated difurfuryl-ketone which was thickened under acidic conditions and is normally liquid at 100° C., said partially hydrogenated difurfuryl-ketone produced by hydrogenating difurfuryl-ketone to an extent at least approximately 15% and no more than approximately 65% of that necessary to completely saturate with hydrogen the carbon to carbon double bonds thereof the ratio by weight of (II) to (I) being no greater than 100 to 100.

6. A composition of matter comprising (I) a rubbery polymer of chloroprene intimately combined with (II) a partially hydrogenated organic reaction product normally liquid at 100° C., and selected from the group consisting of (a) partially hydrogenated monofurfuryl-ketone, (b) partially hydrogenated difurfuryl-ketone, (c) partially hydrogenated organic reaction masses, said (c) being (x) organic reaction masses having a viscosity of at least 50 centipoises at 25° C. and produced by reacting under alkaline conditions furfural and a ketone having at least 2 hydroatoms on an alpha carbon and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof the ratio by weight of (II) to (I) being no greater than 100 to 100.

7. A composition of matter comprising (I) rubbery copolymers of butadiene and styrene intimately combined with (II) a partially hydrogenated organic reaction product normally liquid at 100° C. and selected from the group consisting of (a) partially hydrogenated monofurfuryl-ketone, (b) partially hydrogenated difurfuryl-ketone, (c) partially hydrogenated organic reaction masses, said (c) being (x) organic reaction masses having a viscosity of at least 50 centipoises at 25° C. and produced by reacting under alkaline conditions furfural and a ketone having at least 2 hydrogen atoms on an alpha carbon and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof the ratio by weight of (II) to (I) being no greater than 100 to 100.

8. A composition of matter comprising (I) a rubbery homopolymer of butadiene intimately combined with (II) a partially hydrogenated organic reaction product normally liquid at 100° C. and selected from the group consisting of (a) partially hydrogenated monofurfuryl-ketone, (b) partially hydrogenated difurfuryl-ketone, (c) partially hydrogenated organic reaction masses, said (c) being (x) organic reaction masses having a viscosity of at least 50 centipoises at 25° C. and produced by reacting under alkaline conditions furfural and a ketone having at least 2 hydrogen atoms on an alpha carbon and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof the ratio by weight of (II) to (I) being no greater than 100 to 100.

9. A composition of matter comprising (I) a rubbery copolymer of butadiene and acrylonitrile intimately combined with (II) a partially hydrogenated organic reaction product normally liquid at 100° C. and selected from the group consisting of (a) partially hydrogenated monofurfuryl-ketone, (b) partially hydrogenated difurfuryl-ketone, (c) partially hydrogenated organic reaction masses, said (c) being (x) organic reaction masses having a viscosity of at least 50 centipoises at 25° C. and produced by reacting under alkaline conditions furfural and a ketone having at least 2 hydrogen atoms on an alpha carbon and then hydrogenating (x) by combining hydrogen therewith to an extent at least approximately 15% and no more thn approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof the ratio by weight of (II) to (I) being no greater than 100 to 100.

References Cited in the file of this patent

UNITED STATES PATENTS 2,190,600    Kaupp et al. _____ Feb. 13, 1940